(12) United States Patent
Barndt et al.

(10) Patent No.: US 6,222,698 B1
(45) Date of Patent: Apr. 24, 2001

(54) MAGNETIC TAPE DIMENSIONAL INSTABILITY COMPENSATION BY VARYING RECORDING HEAD AZIMUTH ANGLE

(75) Inventors: Richard D. Barndt, Fremont; Carl P. Taussig, Redwood City, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/083,854

(22) Filed: May 22, 1998

(51) Int. Cl.$^7$ ........................................ G11B 5/00
(52) U.S. Cl. ................................................ 360/76
(58) Field of Search ........................ 360/75, 76, 77.01, 360/77.12, 77.13

(56) References Cited

U.S. PATENT DOCUMENTS

| | | | |
|---|---|---|---|
| 4,539,615 | * 9/1985 | Arai et al. | 360/76 X |
| 5,371,638 | 12/1994 | Saliba | 360/77.12 |
| 5,452,152 | * 9/1995 | Rudi | 360/77.12 |
| 5,629,813 | * 5/1997 | Baca et al. | 360/77.12 |
| 5,689,384 | 11/1997 | Albrecht et al. | 360/77.12 |
| 5,982,711 | * 11/1999 | Knowles et al. | 360/77.12 |

* cited by examiner

Primary Examiner—Andrew L. Sniezek

(57) ABSTRACT

An apparatus and a method of recording and reading data to and from a multi-track magnetic tape utilize a multi-transducer magnetic head that is able to change its azimuth angle relative to the magnetic tape to compensate for variations in tape width due to sources of dimensional instability, such as age-related tape shrinkage. In one embodiment, the magnetic head contains at least eight write/read pairs positioned between two servo readers. Each servo reader includes a servo read transducer. During the original recording operation, the magnetic head is positioned at a write azimuth angle, for example, twenty degrees, such that a small change in the azimuth angle can compensate for age-related tape shrinkage. A read operation includes aligning two servo read transducers to two recorded servo tracks by laterally moving the magnetic head and changing the azimuth angle of the magnetic head to a read azimuth angle. In the preferred embodiment, the lateral movement of the head aligns the top servo read transducer to a desired servo track. Then, the magnetic head is pivoted about the top servo read transducer until the bottom servo read transducer is aligned to an adjacent servo track. The re-recording operation includes recording new data into the recorded tracks using the magnetic head that is positioned at the read azimuth angle.

19 Claims, 10 Drawing Sheets

MAGNETIC TAPE DIMENSIONAL INSTABILITY COMPENSATION BY VARYING RECORDING HEAD AZIMUTH ANGLE

TECHNICAL FIELD

The invention relates generally to recording and reading data to and from a data storage media, such as a magnetic tape, and more particularly to recording and reading data to and from a magnetic tape having tape dimensional instability.

DESCRIPTION OF THE RELATED ART

Magnetic tape data storage devices are widely used to backup data stored in non-removable disk drives in computers. Data stored in non-removable disk drives can be lost due to operator errors or mechanical failures. The cost per unit of stored data in a magnetic tape data storage device is low compared to other forms of electronic data storage. Therefore, the magnetic tape data storage devices provide a cost efficient means to backup data.

One method for storing data using a magnetic tape data storage device is known as "helical scan" technology. A magnetic tape data storage device using the helical scan technology records data in stripes that are diagonal relative to the length of a tape. In helical scan technology, a rotating drum head is used in conjunction with the tape that is slowly driven to yield high data storage capacity.

Another method for storing data using a magnetic tape data storage device is called "linear recording" technology. A magnetic tape data storage device using the linear recording technology records data in multiple parallel tracks that extend in the direction of the length of the tape. Unlike the helical scan technology, a stationary multi-transducer magnetic head is used in linear recording technology. With linear recording technology, the write and read transducers can simultaneously operate on a tape. In addition, the speed of the tape in a linear recording device is typically much greater than the speed of the tape in a helical scan device.

Referring to FIG. 1, a conventional configuration of a multi-transducer magnetic head 10 used in a linear recording device is shown. The multi-transducer magnetic head 10 is positioned over a portion of a magnetic tape 12. The width of the magnetic tape 12 can be significantly wider than illustrated in FIG. 1. The magnetic head 10 contains seven write transducers 14 and seven read transducers 16. The write transducers 14 and the read transducers 16 form seven write/read pairs 18, such that each write/read pair 18 contains one write transducer 14 and one read transducer 16. Although the magnetic head 10 is shown to contain only seven write/read pairs 18, other conventional configurations of magnetic heads exist with more or fewer write/read pairs.

A series of parallel data tracks 20 is shown on the magnetic tape 12. Although only seven data tracks 20 are illustrated, additional data tracks could be located above and/or below the seven tracks. Between the data tracks 20 are track spaces 22. The track spaces 22 are unaccessed regions on the magnetic tape 12 during a recording operation. The track spaces 22 correspond to the spaces between write transducers used for recording data into the data tracks 20. Typically, the widths of track spaces 22 are substantially greater than the widths of data tracks 20. The great disparity in widths of data tracks and track spaces is caused by spacing between write transducers on a magnetic head. Due to fabrication difficulties, the write transducers on a magnetic head are spaced much greater than the widths of data tracks. For example, the widths of data tracks 20 can be twenty microns wide, while the widths of track spaces 22 are 200 microns wide. The distance between the outermost data tracks 20 including the widths of the outermost data tracks (hereinafter "track span") is W1.

As shown in FIG. 1, the lengths of the read transducers 16 are less than the lengths of the write transducers 14. The difference in the lengths of the read transducers 16 and the write transducers 14 is to provide error margins on both side of the read transducer 16 to compensate for any age-related tape shrinkage, as well as other sources of track alignment errors. An error margin is the distance from an edge of a track 20 to the closest edge of a read transducer 16 on that track 20.

Magnetic tapes such as tapes formed using a polyethylene terephthalate substrate tend to shrink over the useful life of the tape. The amount of shrinkage depends on several factors, such as temperature, humidity, material of the tape, and time. Age-related tape shrinkage can have a significant effect on the ability of a linear recording device to retrieve valuable data that was recorded onto a magnetic tape. Although age-related tape shrinkage may only involve a shrinkage of a few tenths of a percent in the width of a tape, the outermost read transducers on a magnetic head may be misaligned with the corresponding data tracks, especially if the magnetic head contains numerous write/read pairs. This is primarily due to the fact that track spaces are substantially wider than data tracks, such that a width of a single data track may only comprise about 1% of a track span. The proportion of a width of a single data track versus a track span decreases as more write/read pairs are fabricated on a magnetic head. A greater number of write/read pairs on a magnetic head equates to a higher data transfer rate.

FIG. 2 illustrates the potential effect of the age-related tape shrinkage when the age-related tape shrinkage is not sufficiently compensated by the error margins. In FIG. 2, the same multi-transducer magnetic head 10 and the same magnetic tape 12 that were shown in FIG. 1 are illustrated. However, due to the age-related tape shrinkage, the length of the track span has decreased from W1 to W2. Because of the shrinkage of the magnetic tape 12, the outermost read transducers 16 extend beyond the corresponding outermost data tracks 20. Thus, the data recorded on the outermost data tracks 20 is not reliably read.

Servo tracking techniques have been developed to reduce the effects of read transducer-to-track alignment errors. Known servo tracking techniques vary widely, but most involve dynamically moving the magnetic head in the direction of the width of the tape to position the read transducers over the correct data tracks. However, such servo techniques are not necessarily effective in compensating for age-related shrinkage when used on conventional multi-transducer heads. Referring back to FIG. 2, the top read transducer 16 can be aligned with the top data track 20 if the magnetic head 10 is moved downward. However, the downward movement of the magnetic head 10 would further misalign the bottom read transducer 16 with the bottom data track 20. Consequently, servo tracking techniques do not solve the adverse effects of age-related tape shrinkage in magnetic tapes.

One solution to the age-related tape shrinkage problem is to decrease the number of write/read pairs on a magnetic head. However, this solution will significantly lower the data transfer rate of the data storage device. In addition, sufficient error margins would still be needed to compensate for age-related tape shrinkage.

An effective method to alleviate the age-related tape shrinkage problem without affecting the data transfer rate is to increase the error margin by elongating the write transducers 14. However, longer write transducers 14 will widen the data tracks 20, causing fewer data tracks 20 to be recorded on the magnetic tape 12. Because of demands for greater storage capacity of a magnetic tape used in a linear recording device, there is a desire to increase the density of tracks on the magnetic tape. Thus, an increase in the number of tracks on a magnetic tape is desired without changing the width of the tape. Although increasing the widths of the data tracks 20 is not the preferred solution, typical conventional linear recording devices have much longer write transducers compared to the read transducers to provide wider error margins. For example, the write transducers 14 could be twenty-seven microns long which would create twenty-seven micron data tracks 20, prior to any age-related tape shrinkage. The read transducers 16 could be thirteen microns in length. In this example, the error margins on both sides of the read transducers 16 will each be seven microns, if the read transducers 16 are positioned in the center relative to the write transducers 14. In this configuration, more than half of the widths of the data tracks 20 are used for error margins.

What is needed is a linear recording device and a method to reduce the widths of data tracks so as to increase the track density of a magnetic tape while compensating for age-related tape shrinkage without adversely affecting data transfer rates.

SUMMARY OF THE INVENTION

An apparatus and a method of recording and reading data to and from a multi-track magnetic tape utilize a multi-transducer magnetic head that is able to change its azimuth angle relative to the magnetic tape to compensate for variations in tape width due to age-related tape shrinkage or other factors that influence tape dimensions. The change in the azimuth angle of the magnetic head is accomplished by pivoting the magnetic head relative to the length of the magnetic tape. The change in the azimuth angle of the magnetic head aligns read transducers on the magnetic head to recorded data tracks on a magnetic tape that has been affected by tape shrinkage.

In the preferred embodiment, the multi-transducer magnetic head contains a number of write/read pairs positioned between two servo read transducers. Each write/read pair contains a write transducer and a read transducer. Preferably, the read transducers are shorter than the write transducers. The shorter lengths of the read transducers allow the read transducers to be positioned on the magnetic head such that error margins are provided on both sides of the read transducers with respect to recorded data or servo tracks. While not critical to the invention, the magnetic head may contain eight write/read pairs positioned between two servo read transducers.

The method of recording and reading data to and from the multi-track magnetic tape includes a step of recording data using the magnetic head positioned at a write azimuth angle. For example, the write azimuth angle can be approximately twenty degrees, which allows for smaller azimuth angle changes to achieve a given compensation for age-related tape shrinkage, as compared to a write azimuth angle of zero. Although any positive azimuth angle greater than zero may be utilized, as the azimuth angle increases, signal loss during a read operation also increases. Therefore, a write azimuth angle much greater than thirty degrees is not preferred.

To record data to a magnetic tape, the magnetic head is positioned on the magnetic tape by aligning the two servo read transducers to two desired servo tracks that are pre-recorded with servo codes. After the magnetic head is properly positioned, the magnetic head can begin to record. As the magnetic tape is moved, the magnetic head records data into eight data tracks. After the eight data tracks are recorded, additional data can be recorded into another set of eight data tracks by positioning the magnetic head over the new eight data tracks. Aligning the magnetic head over the new data tracks is accomplished by laterally moving the magnetic head, such that both servo read transducers are again aligned with a new pair of recorded servo tracks. After the servo read transducers are properly aligned, the write transducers in the write/read pairs are activated to record the additional data into the eight data tracks. The steps for recording additional data can be repeated until all the data tracks are recorded.

The read operation in accordance with the method of the invention includes a step of positioning and orienting the magnetic head such that the read transducers are all aligned within the corresponding data and servo tracks on a magnetic tape that has been affected by age-related tape shrinkage. In one embodiment, the magnetic head is laterally positioned such that the top servo read transducer is aligned with a desired servo track by reading the servo codes recorded in the desired servo track. After the top read transducer is aligned, the magnetic head pivots until the bottom servo read transducer is aligned with an adjacent servo track. Aligning the two servo read transducers will also align the read transducers to the corresponding data tracks. In an alternative embodiment, the bottom servo read transducer is first used to align with a servo track and the magnetic head is pivoted to align the top servo read transducer. In another embodiment, the magnetic head scans across the data and servo tracks to determine the distance between two adjacent servo tracks. The direction of the scan is perpendicular to the lengthwise direction of the tracks. The distance between the two servo tracks is used to calculate the correct read azimuth angle to align the read transducers, including the servo read transducers, to corresponding tracks.

Re-recording on a recorded magnetic tape that has been affected by dimensional instability involves recording over the recorded data tracks. The magnetic head is positioned at the read azimuth angle such that the shrinkage of the tape is offset. The re-recording includes the same steps involved in the original recording operation.

An advantage of the invention is that the track density is increased by decreasing the minimum track width necessary to compensate for physical changes due to dimensional instability.

Another advantage of the invention is that the number of write/read pairs need not be reduced such that high data transfer rate can be maintained.

Still another advantage is that the invention reduces adverse effects associated with re-recording onto a magnetic tape after age-related tape shrinkage occurs.

DETAILED DESCRIPTION

Figure 3:
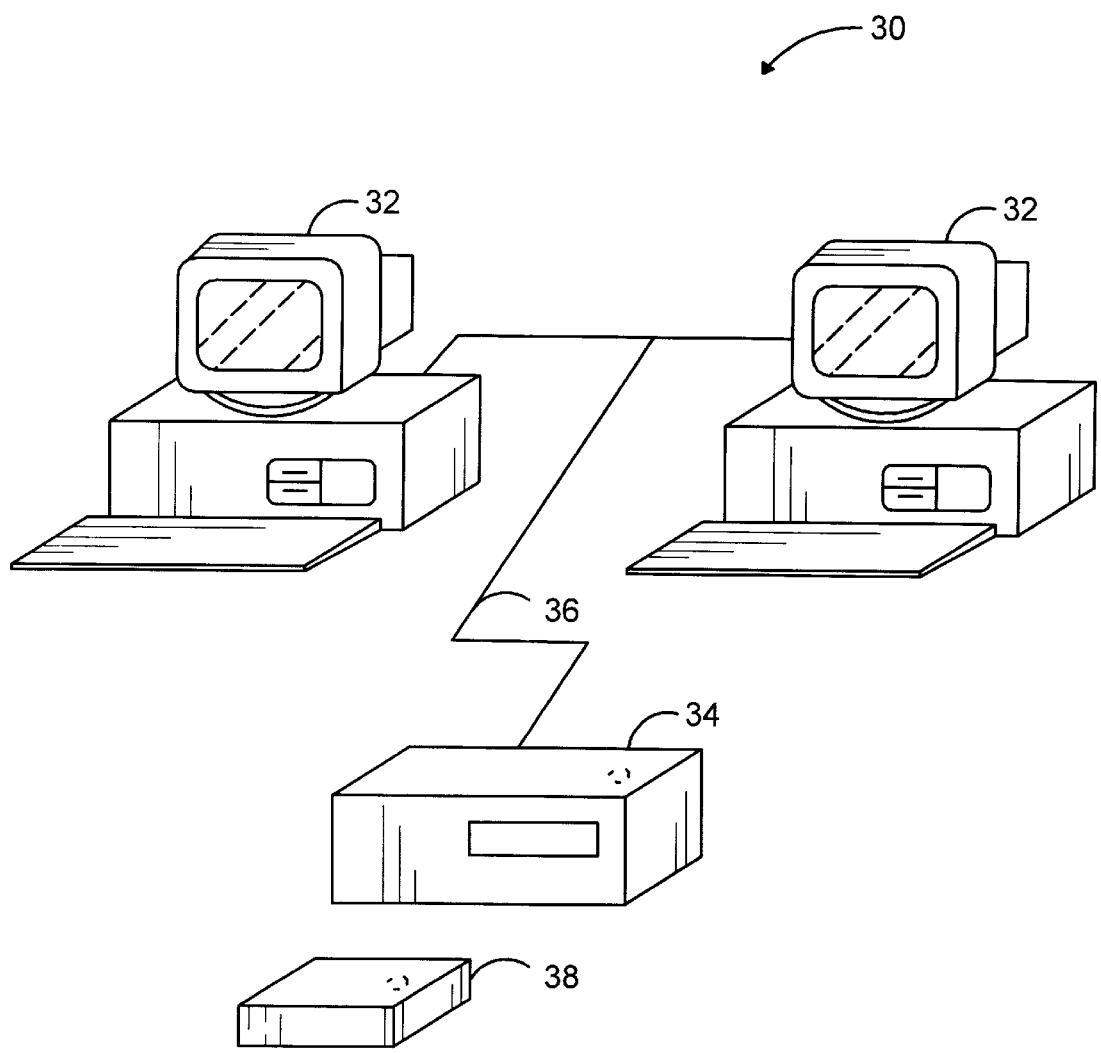
FIG. 3 is a perspective view of a computer network including an external data storage device in accordance with one embodiment of the present invention.

FIG. 3 shows a computer network 30 including one or more computers 32 and a data storage device 34 embodying the invention. The data storage device 34 is connected to the computers 32 by a communication link 36. The communication link 36 can be a physical connection such as a cable or a telephone line. Alternatively, the communication link 36 can be a wireless connection such as a cellular modem connection. The data storage device 34 is a linear recording tape drive. As shown, the data storage device 34 is an external stand-alone device that is shared by the computers 32. In an alternative embodiment, the data storage device 34 is contained within a housing one of the computers 32.

An associated tape cartridge 38 is also shown in FIG. 3. The tape cartridge 38 contains a magnetic tape (not shown) for storing and retrieving data. The data storage device 34 can record data onto the magnetic tape. The recorded data can later be retrieved using the data storage device 34. Although only the single tape cartridge 38 is shown in FIG. 3, an unlimited number of tape cartridges can be utilized by the data storage device 34.

Figure 1:
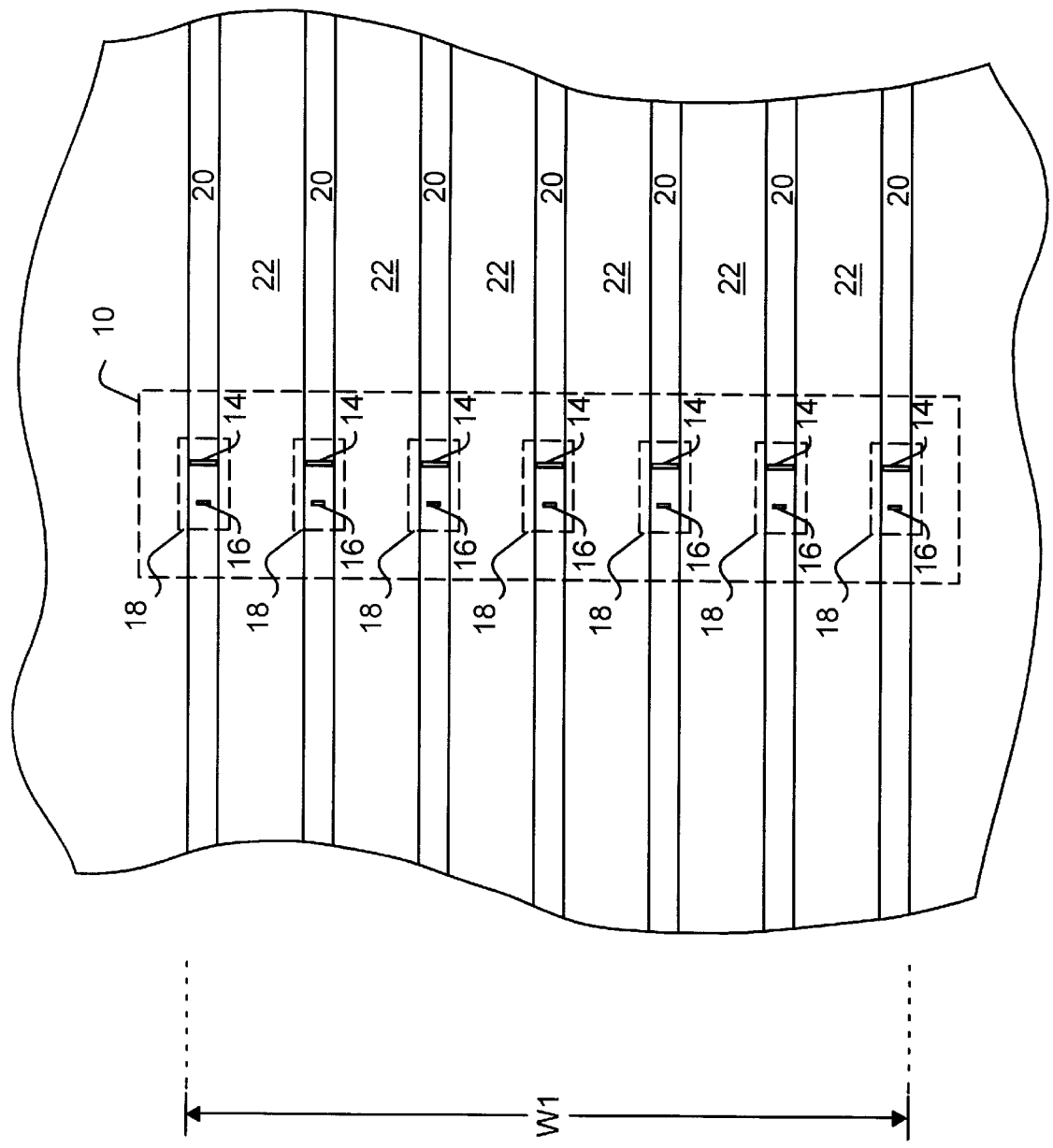
FIG. 1 is an illustration of a conventional multi-transducer magnetic head placed on a magnetic tape prior to any age-related dimensional shrinkage.
Figure 2:
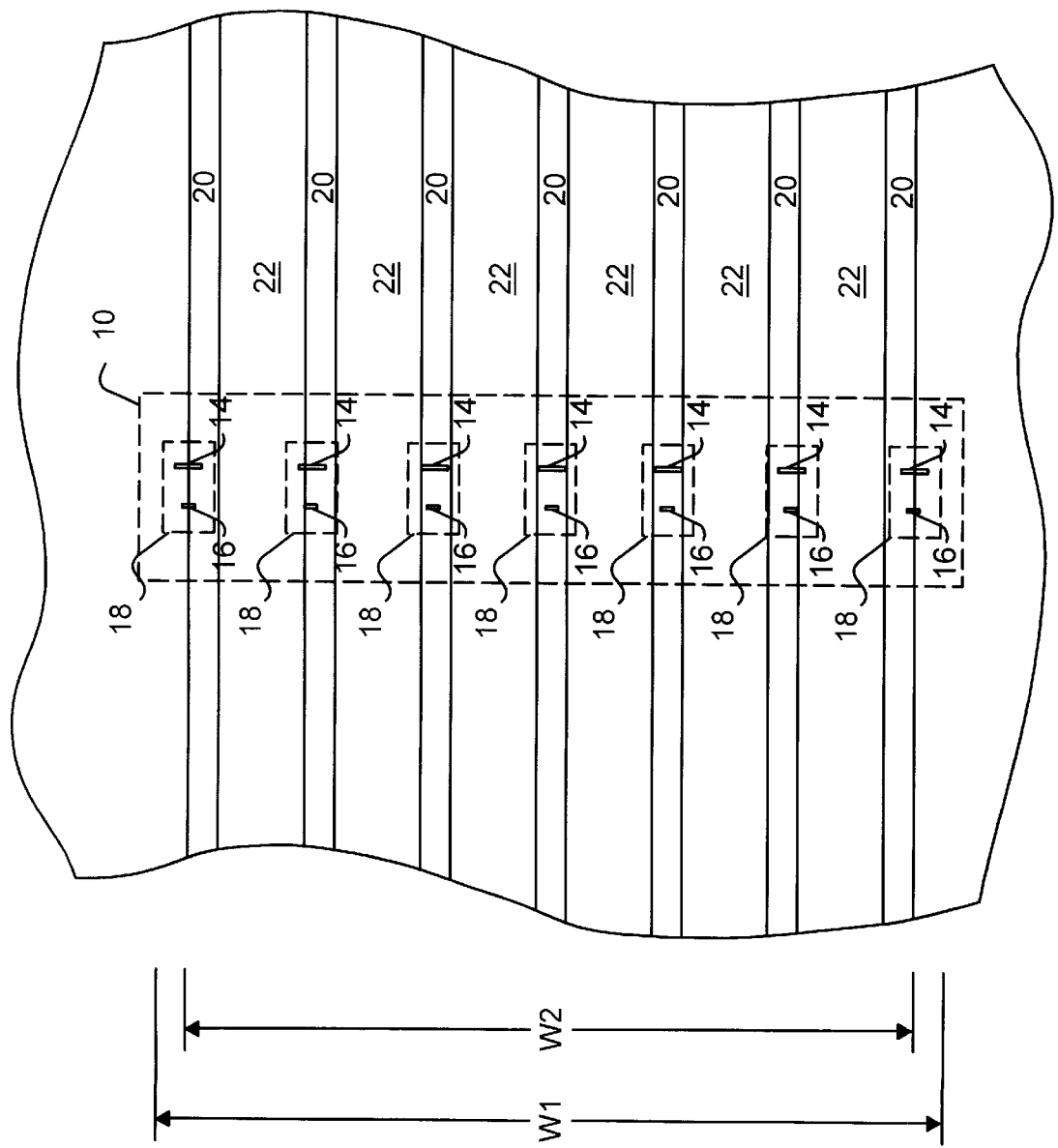
FIG. 2 is an illustration of the conventional multi-transducer magnetic head placed on the magnetic tape of FIG. 2 after age-related dimensional shrinkage.
Figure 4:
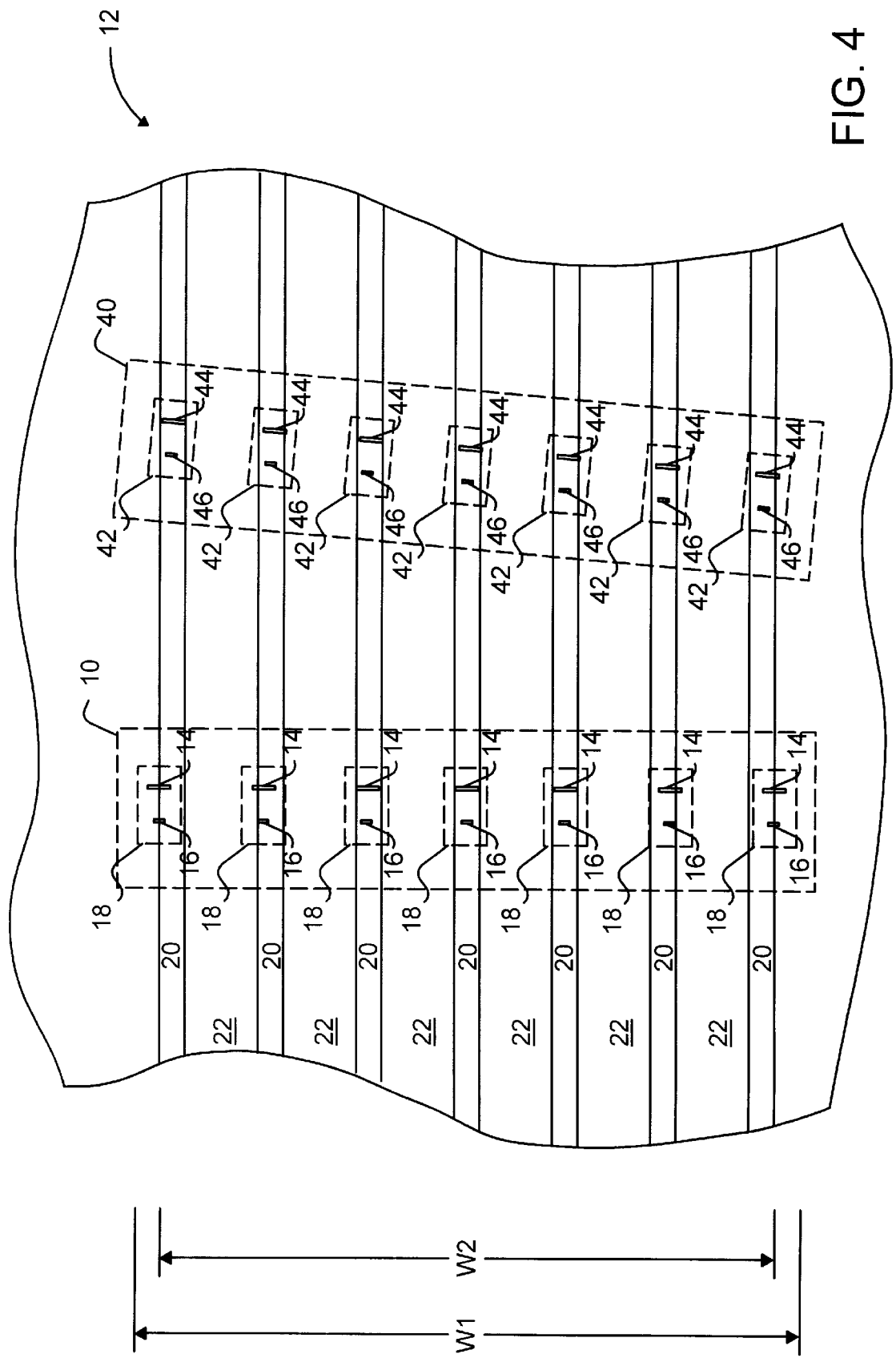
FIG. 4 is an illustration of a multi-transducer magnetic head that is pivoted at an azimuth angle to compensate for age-related tape shrinkage in accordance with the present invention.

FIG. 4 illustrates the core concept of the present invention. The magnetic tape 12 is the same magnetic tape 12 of FIG. 2 that has been affected by age-related tape shrinkage. Again, the track span has been reduced from W1 to W2. The magnetic head 10 is also the same magnetic head 10 of FIG. 2. Again, the outermost read transducers 16 of the magnetic head 10 are not within the outermost data tracks 20, and thus are misaligned. A multi-transducer magnetic head 40 is also shown in FIG. 4. The magnetic head 40 is essentially identical to the magnetic head 10. The magnetic head 40 contains seven write/read pairs 42 formed by, seven write transducers 44 and seven read transducers 46. However, the magnetic head 40 is rotated clockwise from the position of the magnetic head 10. The angle of the magnetic head 40 relative to the tape path will be referred as an "azimuth angle." In this position, all of the read transducers 46 of the magnetic head 40 are within the data tracks 20 allowing each read transducer 46 to read from a corresponding data track 20.

Figure 5:
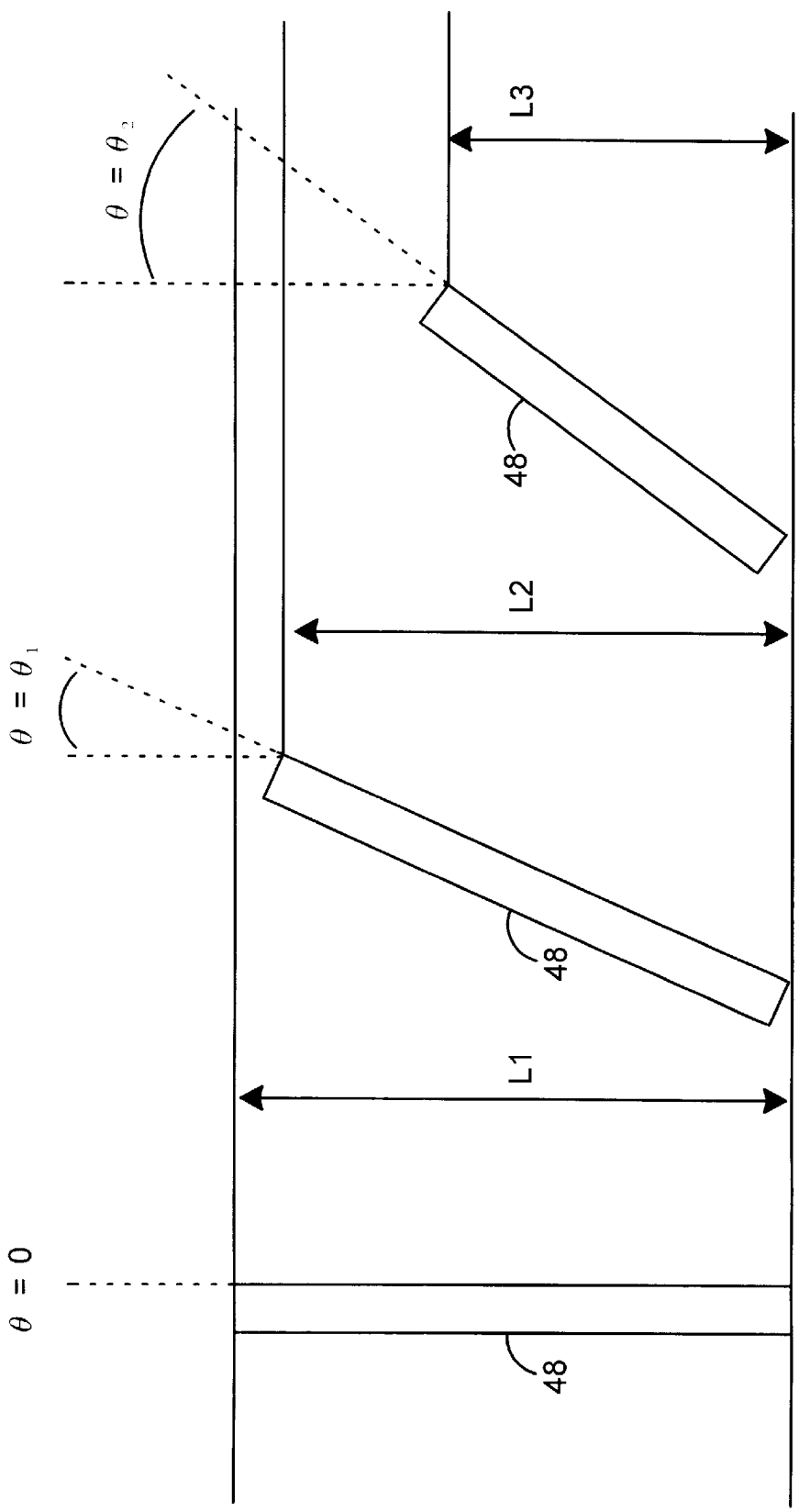
FIG. 5 is an illustration of a rod that is pivoted to various azimuth angles to decrease the height of the rod.

The effects of different azimuth angles can be seen in FIG. 5. Shown in FIG. 5, a rod 48 is positioned at different azimuth angles. The rod 48 has a length equal to L1. At an azimuth angle of zero, the rod 48 has a height of L1. At an azimuth angle of θ1 where θ1>0, the height of rod 48 is L2, such that L2<L1. At an azimuth angle of θ2 where θ2>θ1, the height of rod 48 is L3, such that L3<L2. Therefore, as the azimuth angle increases the height of an object decreases. The height of the rod 48 can be expressed by:

$$l * \cos \theta = h, \quad (Eqn. 1)$$

where l=length of the rod 48 and h=height of the rod 48.

Figure 6:
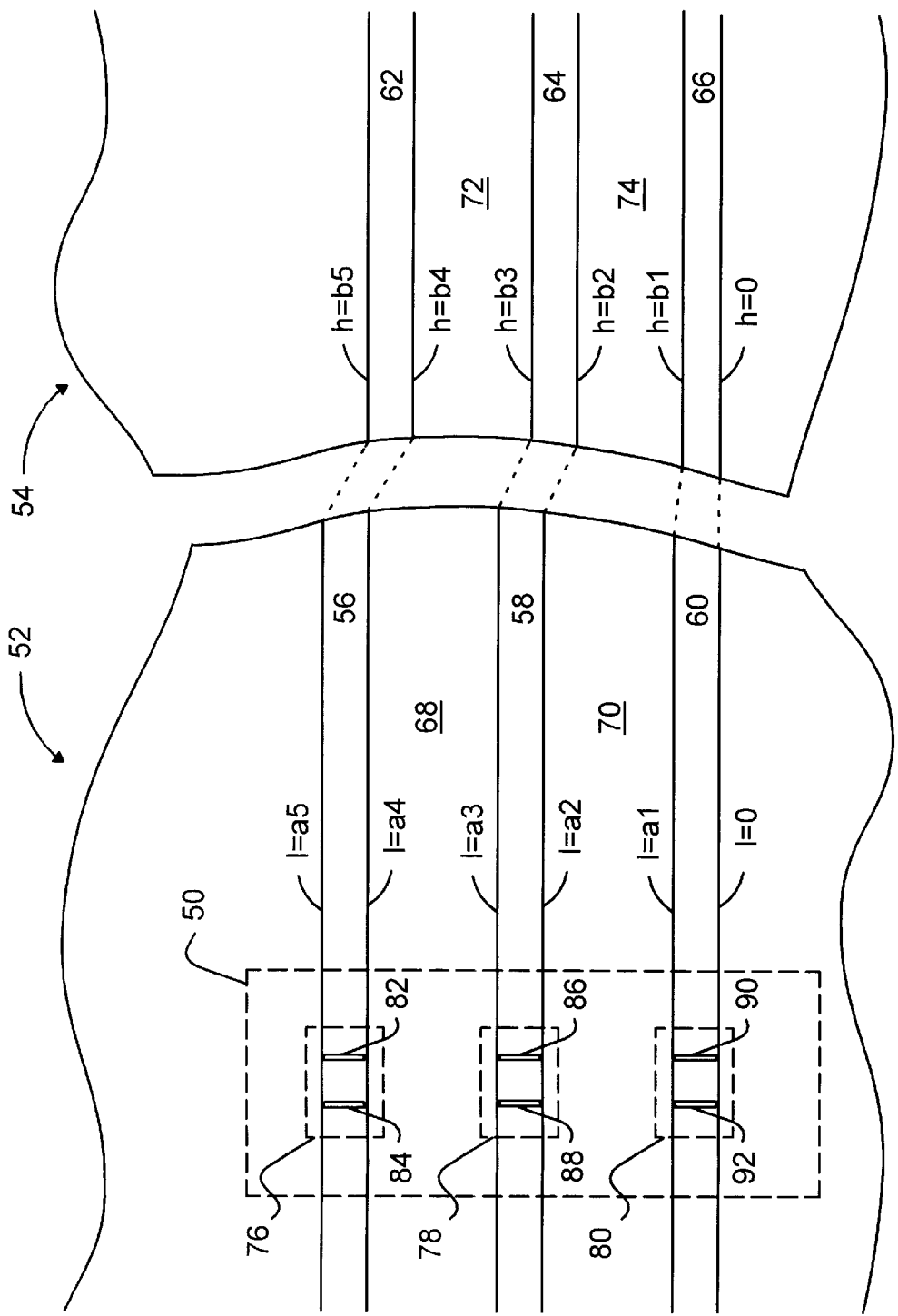
FIG. 6 is an illustration of a simple magnetic head that is positioned on a magnetic tape prior to any age-related tape shrinkage.

To illustrate the manner in which all of the read transducers 46 of the magnetic head 40 of FIG. 4 will align with corresponding data tracks 20, also of FIG. 4, after age-related tape shrinkage, a simple magnetic head 50 on a magnetic tape 52 is shown in FIG. 6. The magnetic tape 52 has not been affected by age-related tape shrinkage. Next to the magnetic tape 52 is a magnetic tape 54. The magnetic tape 54 represents the magnetic tape 52 after age-related tape shrinkage. The magnetic tape 52 contains data tracks 56, 58, and 60. The magnetic tape 54 contains data tracks 62, 64, and 66. The data tracks 62, 64, and 66 represent the data tracks 56, 58, and 60, respectively, after age-related shrinkage. Also shown in the magnetic tape 52 are track spaces 68 and 70. The track spaces 68 and 70 are represented by track spaces 72 and 74, respectively, after age-related shrinkage.

For simplification, the magnetic head 50 contains only three write/read pairs 76, 78, and 80. Similar to the magnetic heads 10 and 40, write transducers 82, 86, and 90 and read transducers 84, 88, and 92 form the write/read pairs 76, 78, and 80. The write transducer 82 and the read transducer 84 form the write/read pair 76, while the write transducer 86 and the read transducer 88 form the write/read pair 78. Lastly, write transducer 90 and the read transducer 92 form the write/read pair 80. The lengths of the read transducers 84, 88, and 92 are equal to the lengths of the write transducers 82, 86, and 90 and the widths of data tracks 56, 58, and 60.

The edges of the data tracks 56, 58, and 60 are denoted by l=0, a1, a2, a3, a4, and a5 for convenient references. The edges of the data tracks 56, 58, and 60 correspond with the edges of the read transducers 84, 88, and 92. In addition, the edges of the data tracks 62, 64, and 66 are referenced by h=0, b1, b2, b3, b4, and b5. These reference positions can be used to define the widths of data tracks 56–66 as well as the widths of track spaces 68–74. For example, the width of data track 60 is the distance between l=a1 and l=0. Therefore, the width of data track 60 is a1. The width of track space 68 can be expressed as the distance between l=a4 and l=a3 or a4 minus a3.

If the magnetic head 50 is rotated to a correct azimuth angle, the read transducers 84, 88, and 92 can be positioned over the corresponding data tracks 62, 64, and 66, respectively. Essentially, by changing the heights of the read transducer 84, 88, and 92 along with the height of the spaces between the read transducers 84, 88, and 92, the edges of the read transducers 84, 88, and 92 can be aligned with the edges of the data tracks 62, 64, and 66. In respect to the alignment of the read transducers 84, 88, and 92 to the data tracks 62, 64, and 66, the most convenient way to view changes in widths is in percentages.

Age-related tape shrinkage tends to decrease the width of a magnetic tape in a uniform fashion. Therefore, the widths of the data tracks 56, 58, and 60 will decrease to the widths of the data tracks 62, 64, and 66 by a same percentage. The widths of the track spaces 68 and 70 are similarly reduced by the same percentage as the widths of the track spaces 72 and 74. From a common reference point along the vertical direction of a tape such as l=0, the distance to any other vertical point will decrease by the same percentage as a result of age-related tape shrinkage. For example, if the age-related tape shrinkage has decreased the width of the magnetic tape 52 by ten percent, the width of the data track 60 denoted by the distance a1 will be reduced to the width of the data track 66 denoted by the distance b1, where the distance b1 is equivalent to ninety percent of the distance a1. Similarly, the distance b2, or the width of the data track 66 plus the width of the track space 74, is equivalent to ninety percent of the distance a2, or the width of the data track 60 plus the width of the track space 70. In fact, the distances b3, b4, and b5 are all equivalent to ninety percent of the distances a3, a4, and a5, respectively.

Figure 7:
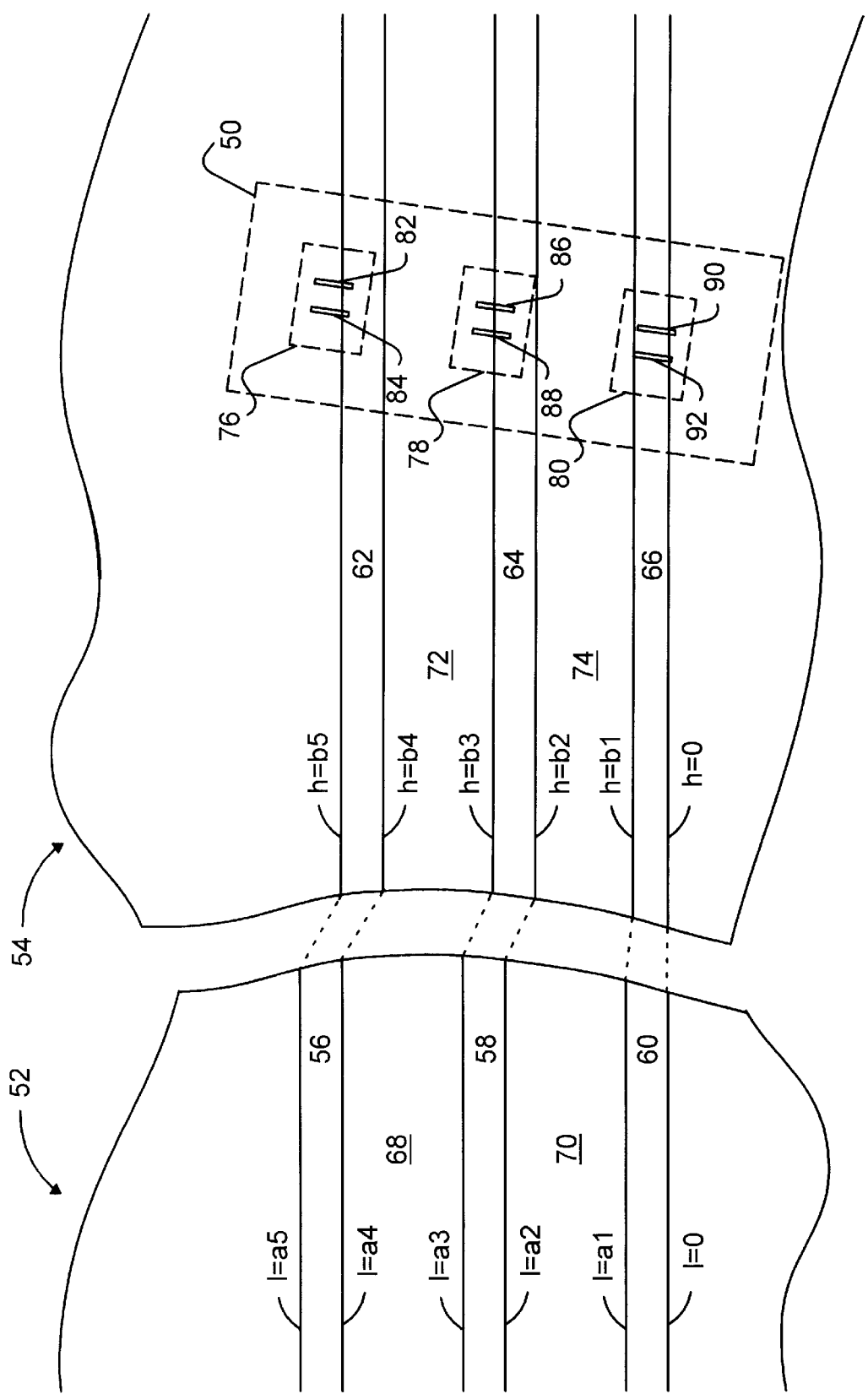
FIG. 7 is an illustration of the magnetic head in FIG. 6 that is being pivoted to an azimuth angle to compensate for age-related tape shrinkage by aligning read transducers of the magnetic head to corresponding data tracks in accordance with the present invention.

FIG. 7 shows the magnetic head 50 that is in the process of being rotated in a clockwise direction. The bottom edge of the read transducer 92 is fixed to the bottom of the data track 66 or where h=0. In other words, the magnetic head 50 is being rotated with the axis of rotation being the bottom of the read transducer 92. At the current position of the magnetic head 50, the read transducers 84, 88, and 92 are not all aligned to the data tracks 62, 64, and 66. However, as illustrated in FIG. 4, the height of an object decreases with the increase in the azimuth angle. For example, the height of the read transducer 92 initially equaled the distance a1. However, as the azimuth angle is increased, the height of the read transducer 92 will eventually be equal to the height b1. In the example above, the distance b1 is equal to ninety percent of the distance a1. Using the Eqn. 1, the azimuth angle that will yield such height for the read transducer 92 can be calculated. Eqn. 1 states that $l*\cos\theta=h$. Substituting l and h with a1 and b1, respectively, yields $a1*\cos\theta=b1$ or $\cos\theta=b1/a1$. Since b1 is ninety percent of a1, $b1/a1=0.9$. Substituting 0.9 for b1/a1 yields $\cos\theta=0.9$ or $\theta=\cos^{-1}(0.9)$. Solving for θ yields θ=25.84°. Therefore, in the example, at the azimuth angle of 25.84°, the height of the read transducer 92 will equal the distance b1 or the width of the data track 66. In fact, at the azimuth angle of 25.84°, all of the read transducers 84, 88, and 92 will lie within the tracks 62, 64, and 66. In other words, all of the heights from l=0, a1, a2, a3, a4 and a5 that represented the initial heights of the edges of the read transducers 84, 88, 92 will be reduced by ten percent. Therefore, at the azimuth angle of 25.84°, the heights a1, a2, a3, a4, and a5 will be exactly reduced to the heights b1, b2, b3, b4, and b5, thereby aligning the read transducers 84, 88, and 92 to the data tracks 62, 64, and 66, respectively.

The alignment concept described above with references to FIGS. 6 and 7 does not depend on the number of read transducers on a magnetic head. A magnetic head with additional read transducers can be aligned with a tape affected by age-related tape shrinkage in the same manner. However, a major concern with reading data in data tracks with read transducers positioned at a different azimuth angle than the azimuth angle of write transducers when recording the data is "azimuth loss." Typically, read transducers are fabricated in parallel with write transducers. Therefore, if a magnetic head must be rotated, the read transducers will be reading the data at a different azimuth angle than the azimuth angle when the data was recorded. The difference in the write azimuth angle and the read azimuth angle can greatly reduce the quality of the read signal of the data that is being read.

One method to reduce the azimuth loss is to record the data into a magnetic tape with a magnetic head positioned at an initial azimuth angle such that the write transducers are recording at that initial azimuth angle. After age-related tape shrinkage, the degree of rotation necessary to compensate for the shrinkage is smaller when the initial azimuth angle is large. The percentage of shrinkage can be expressed by the following equation:

$$\% \text{ of shrinkage} = \Delta h/h = 1 - (\cos(\theta_0 - \Delta\theta))/\cos\theta_0, \quad \text{(Eqn. 2)}$$

where $\theta_0$ is the initial azimuth angle, $\Delta\theta$ is in degrees, and h is the distance between any two points on a magnetic tape in the cross tape direction.

Using Eqn. 2, the change in azimuth angle that is necessary to compensate for 0.1 percent shrinkage is 2 degrees if the initial azimuth angle was zero degrees. However, the change in azimuth angle that is necessary to compensate for the same 0.1 percent shrinkage when the initial azimuth angle was twenty degrees is only 0.17 degrees. Thus, if the initial azimuth angle was twenty degrees, the azimuth angle of the magnetic head need only be rotated 8.5% to compensate for 0.1% age-related tape shrinkage compared to when the initial azimuth angle was zero.

Figure 8:
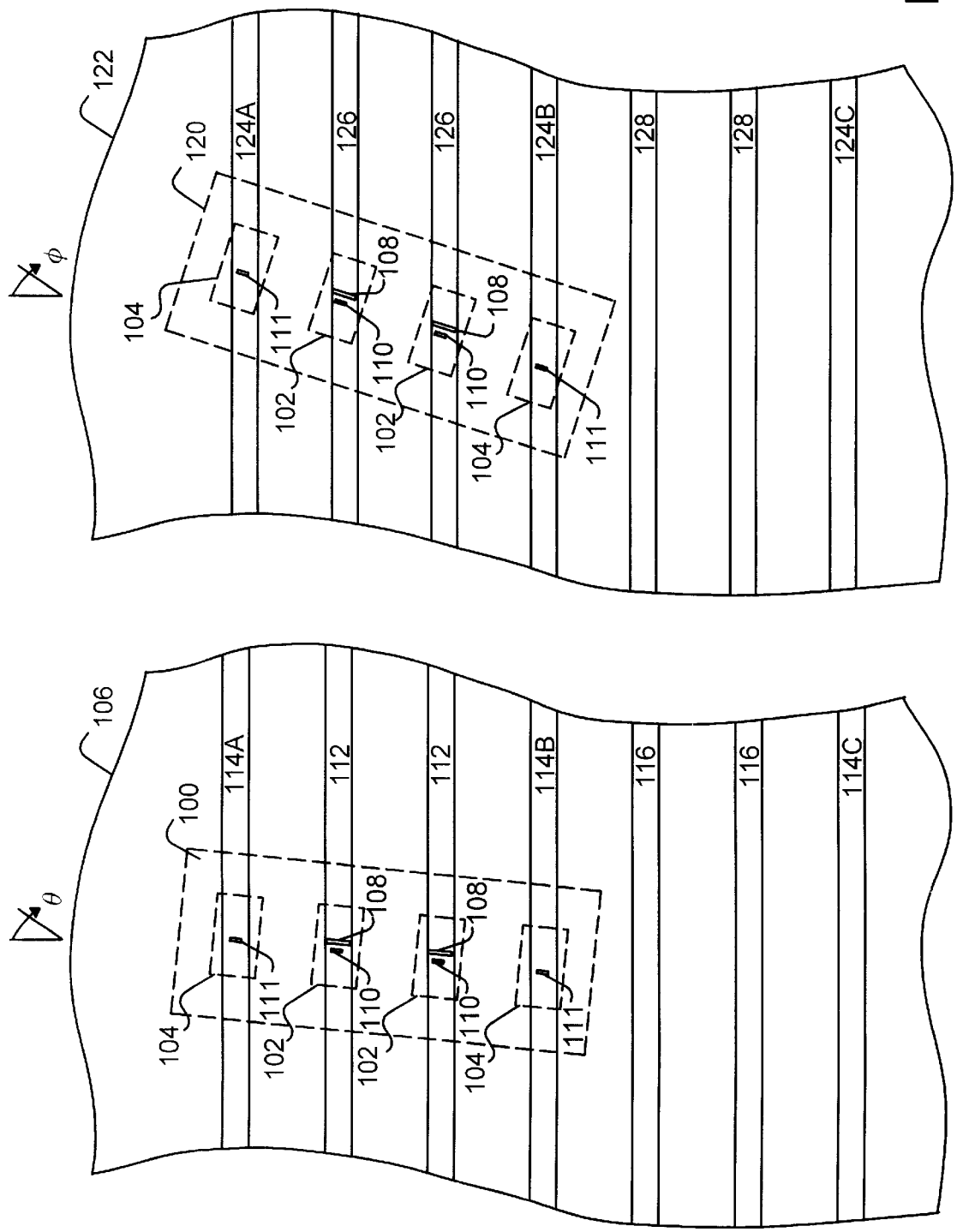
FIG. 8 is an illustration of a multi-transducer magnetic head positioned at a write azimuth angle during original recording and the same magnetic head positioned at a read azimuth angle to compensate for age-related tape shrinkage in accordance with the present invention.

In FIG. 8, a magnetic head 100 in accordance with the present invention having two write/read pairs 102 and two servo readers 104 is positioned on a magnetic tape 106. The magnetic head 100 is pivoted such that an azimuth angle θ is created. Each of the pairs 102 contains a write transducer 108 and a read transducer 110. Each of the servo readers 104 contains a servo read transducer 111. Although the magnetic head 100 contains only two write/read pairs 102 and two servo readers 104, the magnetic head 100 can be configured to contain more or fewer write/read pairs 102 as well as more or fewer servo readers 104. For example, the magnetic head 100 may contain eight write/read pairs 102 that are positioned between the two servo readers 104.

As shown in FIG. 8, the read transducers 110 are positioned to the left of the write transducers 108. This configuration allows the read transducers 110 to simultaneously read data that is being recorded by the write transducers 108 as the magnetic tape 106 travels from right to left. The simultaneous reading of the recorded data ensures that the data is being recorded properly. In another embodiment, the read transducers 110 are positioned to the right of the write transducers 108 to facilitate a left-to-right magnetic tape movement.

Preferably, the lengths of the read transducers 110 are slightly shorter than the lengths of the write transducers 108 to compensate for any alignment errors. The read transducers 110 of the write/read pairs 102 are positioned such that the heights of those read transducers 110 are centered on corresponding data tracks 112. Similarly, the servo read transducers 111 of the servo readers 104 are positioned such that the heights of the servo read transducers 111 are centered on corresponding servo tracks 114A and 114B. The positioning of the read transducers 110 and the servo read transducers 111 allows for small error margins in the data tracks 112 or the servo tracks 114A and 114B on both sides of the read transducers 110 as the read transducers 110 are reading data from the data tracks 112.

The recording operation using the magnetic head 100 involves moving the magnetic tape 106 and activating the write transducers 108. In one embodiment, the magnetic tape 106 is moving from right to left. The right to left movement of the magnetic tape 106 allows the read transducers 110 to read data that is being recorded by the write transducers 108. By simultaneously writing and reading the data, proper recording operation is assured. The magnetic head 100 is fixed at a write azimuth angle θ during the recording operation. As an example, the write azimuth angle θ is twenty degrees such that a smaller change in the azimuth angle is required to compensate for any age-related tape shrinkage as compared to a write azimuth angle of zero. Although a twenty degree azimuth angle may be used during a recording operation, other write azimuth angles can be utilized.

The servo tracks 114A, 114B and 114C contain servo codes that have been pre-recorded. The servo codes can be used during a reading operation to align a magnetic head such that read transducers of that magnetic head are within a set of data tracks on a magnetic tape. A set of data tracks is shown in FIG. 8 as two adjacent data tracks 112 that are flanked by two adjacent servo tracks 114A and 114B. Another set of data tracks is shown in FIG. 8 as two adjacent data tracks 116 that are positioned between the servo track 114B and servo track 114C. Using the servo codes in the servo tracks 114A and 114B for alignment, the write transducers 108 of the write/read pairs 102 record data into the data tracks 112.

To record data onto the data tracks 116, the magnetic head 100 is laterally lowered such that the top servo read transducer 111 of the servo reader 104 is positioned over the servo track 114B. Positioning the magnetic head 100 involves lowering the magnetic head 100 until the servo read transducer 111 is able to read the servo codes in the servo track 114B. In positioning the top servo read transducer 111 over the servo track 114B, the bottom servo read transducer 111 will also be positioned over the servo track 114C. To record the additional set of data tracks 116, the magnetic tape 106 is again moved from right to left. Additional data can be recorded into other data tracks on the magnetic tape in a similar manner.

After the recording operation, the magnetic head 100 can be utilized to read the recorded data from the data tracks 114. If the recorded magnetic tape 106 has not been affected by age-related tape shrinkage, the. azimuth angle of the magnetic head 100 does not have to be changed. In order to read the data from the data tracks 112, the magnetic head 100 is laterally positioned such that the servo read transducers 111 of the servo readers 104 are within the servo tracks 114A and 114B and the read transducers 110 of the write/read pairs 102 are within the data tracks 112. To read the data from the data tracks 116, the magnetic head is laterally lowered such that the servo read transducers 111 of the servo readers 104 are within the servo tracks 114B and 114C, while the read transducers 110 of the write/read pairs 102 are within the data tracks 116.

FIG. 8 also shows a magnetic head 120 positioned on a magnetic tape 122. The magnetic head 120 is identical to the magnetic head 100, except the azimuth angle of the magnetic head 120 is now greater.

Similarly, the magnetic tape 122 is identical to the magnetic tape 106. However, the tape 122 has been affected by age-related tape shrinkage after data has been recorded onto the magnetic tape 106. The amount of shrinkage in the magnetic tape 122 can typically range from 0.1 to 0.2 percent. Servo tracks 124A, 124B, and 124C, which have been narrowed due to age-related tape shrinkage, correspond to the servo tracks 114A, 114B, and 114C, respectively. Similarly, data tracks 126 and 128 correspond to the data tracks 112 and 116.

To read the data in the data tracks 126, the magnetic head 120 is positioned and oriented such that the servo read transducers 111 of the servo readers 104 are within the servo tracks 124A and 124B. Consequently, the read transducers 110 of the write/read pairs will be positioned within the data tracks 126. One method to position and orient the magnetic head 120 such that the servo read transducers 111 are within the correct tracks 124A and 124B is to laterally move the magnetic head 120 until the top servo read transducer 111 is able to read the servo codes from the servo track 124A. Then, the lateral movement is terminated and the magnetic head is pivoted about the top servo read transducer 111 until the bottom servo read transducer 111 is able to read the servo codes from the servo track 124B. As the magnetic head 120 is pivoted, the azimuth angle of the magnetic head 120 including the azimuth angle of the read transducers 110 is being increased until a correct read azimuth angle φ is made. Alternatively, the bottom servo read transducer 111 can be aligned with the servo track 124B and used as a pivoting point to align the top servo read transducer 111 to the servo track 124A. In another embodiment, the magnetic head 120 scans for the servo tracks 124A and 124B to determine the distance between the servo tracks 124A and 124B. The distance is used to calculate the read azimuth angle φ that is required to align the read transducers 110 to the corresponding tracks.

After the magnetic head 120 is rotated to the read azimuth angle, the read operation is performed in the same manner as described above in reference to the magnetic head 100. However, the magnetic head 120 could be designed to repeat the position and orient steps when reading from a new set of data tracks.

The re-recording of data into the magnetic tape 122 is accomplished in the same manner as described above in reference to recording data into the magnetic tape 106. The only difference is that during the re-recording operation, the magnetic tape 122 is positioned at an azimuth angle equivalent to the read azimuth angle φ. This has the effect of recording data over the existing data tracks 126 and 128.

Although the recording, reading, and re-recording operations have been described with the magnetic heads 100 and 120 making positive azimuth angles, negative azimuth angles of the same magnitude can also be utilized. The initial recording azimuth angle of the write transducers 108 could have been negative twenty degrees. Then, the azimuth angle could have been increased in magnitude to compensate for age-related tape shrinkage when reading data from the magnetic tape 122.

Figure 9:
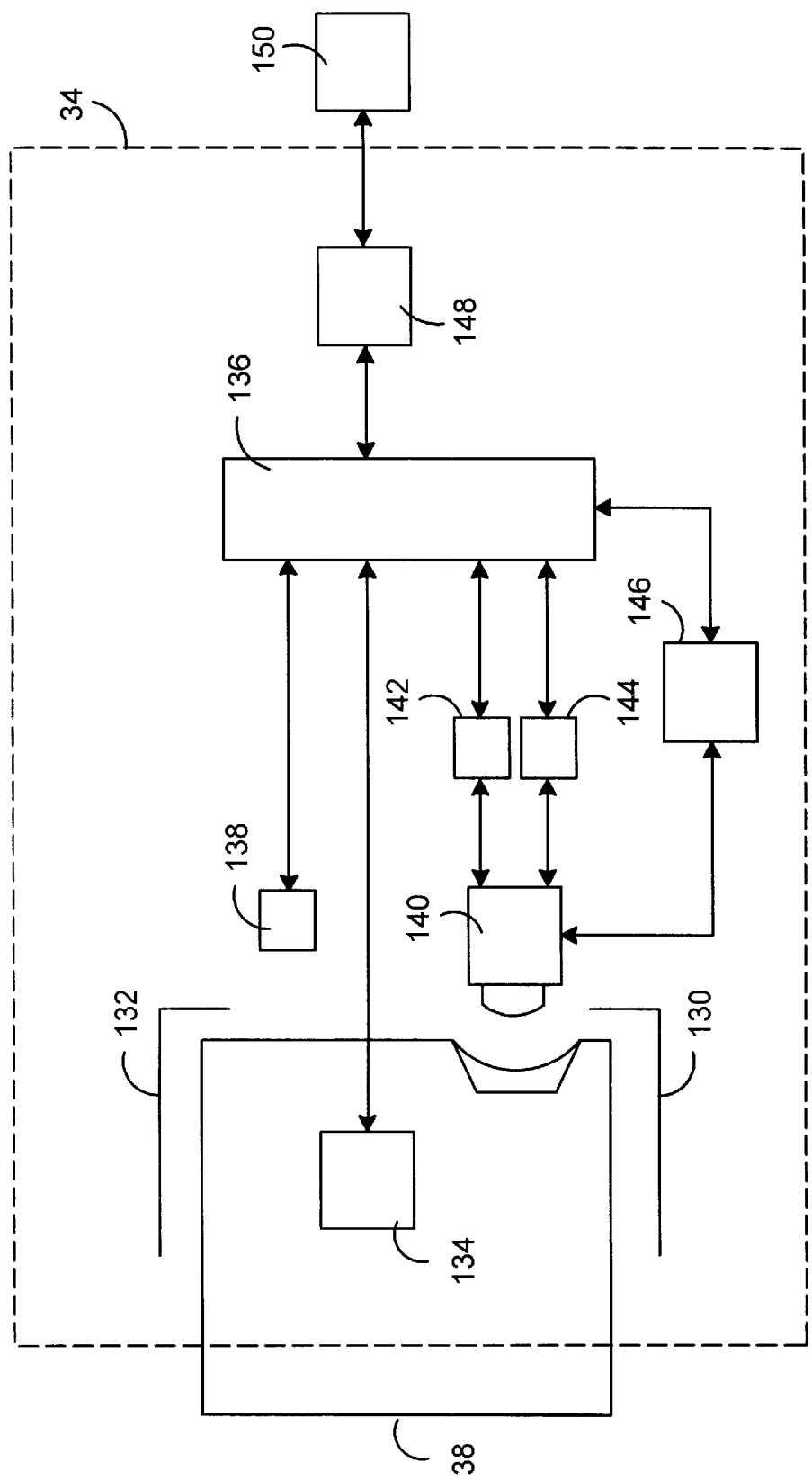
FIG. 9 is a block diagram of the components of a data storage device in accordance with the present invention.

Turning now to FIG. 9, a block diagram of the components of the data storage device 34 is shown. The same tape cartridge 38 in FIG. 3 is now inserted into the data storage device 34. The tape cartridge 38 is held in a stable position by two cartridge positioners 130 and 132. A tape drive mechanism 134 is attached to the tape cartridge 38 for moving the magnetic tape within the tape cartridge 38. The tape drive mechanism 134 is manipulated by and connected to a drive controller 136. Also connected to the drive controller 136 is a cartridge sensor 138. A pivoting magnetic head 140 is operatively connected to a head pivot motor 142, a head stepper motor 144, and a servo processor 146. The servo processor 146 and the motors 142 and 144 are all connected to the drive controller 136. The drive controller 136 is also coupled to interface circuitry 148 that connects to a host system 150. The host system 150 can be a single computer or a network of computers. Although each component of the data storage device 34 is shown as a separate unit, two or more components can be integrated into a common unit.

In operation, the tape cartridge 38 is inserted into the data storage device 34. The tape cartridge 38 is guided to a proper position by the two cartridge positioners 130 and 132. The tape cartridge 38 can be positioned such that the tape drive mechanism 134 is coupled to the tape cartridge 38. When the tape cartridge 38 is properly positioned within the data storage device 34, the cartridge sensor 138 sends a signal to the drive controller 136. Preferably, the cartridge sensor 138 is configured to indicate when the tape cartridge 38 is not properly positioned.

During recording or re-recording operation, the host system 150 sends information containing the data with other protocols. The interface circuitry 148 receives the information and relays the information to the drive controller 136. The drive controller 136 moves the magnetic head 140 to a desired lateral position on the magnetic tape within the tape cartridge by directing the head stepper motor 144. In an alternative configuration, the magnetic tape can be manipulated to abut the magnetic head 140. Depending upon whether the operation is recording or re-recording, the drive controller 136 rotates the magnetic head 140 to the write azimuth angle or the read azimuth angle by activating the head pivot motor 142. After the magnetic head 140 is properly oriented, the drive controller 136 activates the tape mechanism moving the magnetic tape. The servo processor 146 monitors for recorded servo codes to properly align and pivot the magnetic head 140 to the data tracks of the magnetic tape.

During the read operation, the drive controller 136 activates the tape drive mechanism 134 moving the magnetic tape. The drive controller 136 directs the head pivot motor 142 and the head stepper motor 144 to properly position and orient the magnetic head 140 while the servo processor 146 monitors for recorded servo codes, such that each read transducer of the magnetic head 140 is positioned within a correspond data track or a servo track as described above in reference to FIG. 8. The data retrieved by the magnetic head 140 is transferred to the host system 150.

Figure 10:
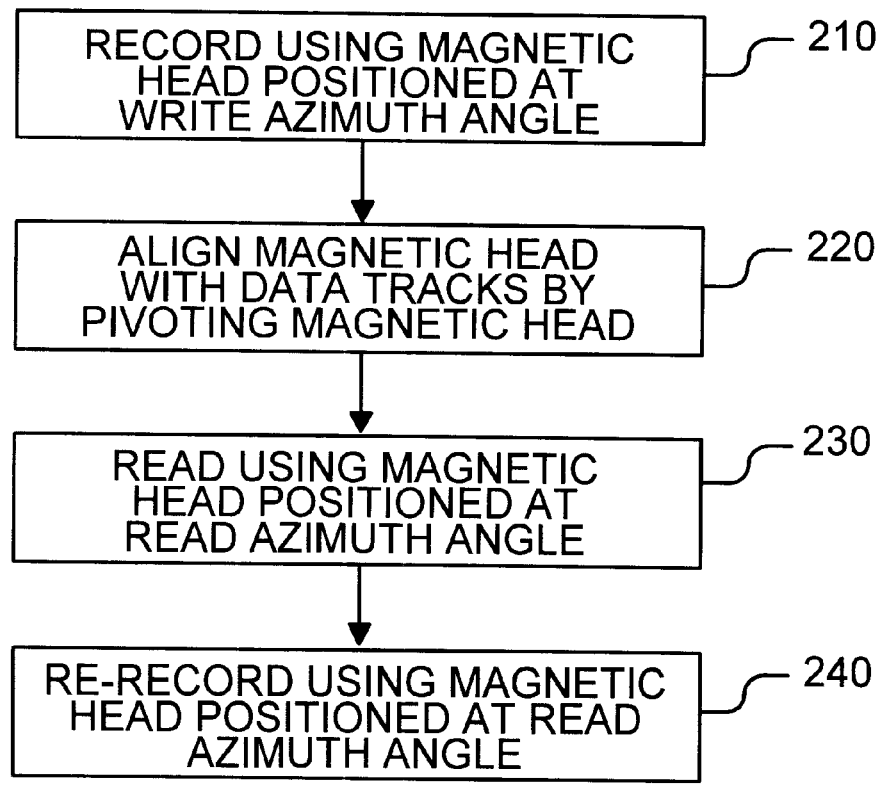
FIG. 10 is a flow diagram of recording and reading data to and from a data storage device in accordance with the invention.

A method of recording and reading data to and from the data storage device 34 to compensate for variations in tape width in accordance with the invention will be described with references to FIG. 10. At step 210, a magnetic head positioned at a write azimuth angle records data into data tracks and servo codes into servo tracks on a magnetic tape. For example, the write azimuth angle can be twenty degrees. However, various write azimuth angles greater than zero may be utilized. In one embodiment, the magnetic head contains eight write/read pairs and two servo readers, such that the data can be recorded into eight data tracks. Each write/read pair contains a write transducer and a read transducer, while each servo reader contains a servo read transducer. After the eight write transducers record into the eight data tracks, the magnetic head is laterally repositioned, either lower or higher, in order to record into another eight data tracks.

Next, at step 220, the read operation begins. Another magnetic head or the same magnetic head used for the recording is utilized to retrieve the recorded data. If the magnetic tape has not been affected by age-related tape shrinkage, the data is read by the magnetic head positioned at the write azimuth angle. However, if the magnetic tape has been affected by age-related tape shrinkage, the magnetic head must be positioned and oriented such that the read transducers of the magnetic head are all aligned within the corresponding data or servo tracks. In one embodiment, the magnetic head is laterally moved until the top servo read transducer retrieves servo codes from a desired servo track. Then, the magnetic head is pivoted about the top servo read transducer until the bottom servo read transducer is aligned and servo codes are read by the bottom servo read transducer. Alternatively, the bottom read transducer is first aligned and then the magnetic head is pivoted to align the top read transducer. In another embodiment, the magnetic head scans across the data and servo tracks to determine the distance between two adjacent servo tracks. That distance is used to calculate the correct read azimuth angle to properly align all the read transducers to corresponding tracks.

Following the alignment, the magnetic head reads the data and the servo codes from the data tracks and the servo tracks at step 230. If another set of data tracks needs to be read, the magnetic head is laterally repositioned on the magnetic tape such that the read transducers are aligned with the new set of data tracks. The servo tracks are utilized to align the magnetic head. At step 240, the magnetic head re-records new data into the recorded tracks. The magnetic head is positioned at the same azimuth angle for the read operation to re-record the new data into the recorded data tracks.

What is claimed is:

1. A method of recording and reading data to and from a multi-track magnetic tape to compensate for variations in tape width of said multi-track magnetic tape comprising steps of:

recording said data into a plurality of tracks on said multi-track magnetic tape, including setting a write azimuth angle for positioning a magnetic head having an array of transducers used to record said data said write azimuth angle being relative to a widthwise direction of said multi-track magnetic tape and being greater than zero degrees;

at times subsequent to said step of recording, determining a read azimuth angle relative to said widthwise direction of said multi-track magnetic tape for magnetic-head positioning during retrieval of said data from said plurality of tracks, said step of determining being responsive to a variation in said tape width since said step of recording said data, said read azimuth angle being adjustable relative to said write azimuth angle and having a measurement greater than zero degrees; and employing said determined read azimuth angle during a read operation of said data in said plurality of tracks.

2. The method of claim 1 wherein said step of recording said data includes recording said data using said magnetic head positioned at said write azimuth angle that is within an inclusive range of five degrees and thirty degrees.

3. The method of claim 1 further comprising a step of re-recording data into said plurality of tracks on said multi-track magnetic tape with said magnetic head positioned at said determined read azimuth angle.

4. The method of claim 1 further comprising a step of mounting said magnetic head such that said magnetic head is rotatable within a range that includes said write and read azimuth angles.

5. The method of claim 4 wherein said step of determining said read azimuth angle further includes pivoting said magnetic head by monitoring for recorded servo codes in said multi-track magnetic tape.

6. The method of claim 4 wherein said step of determining said read azimuth angle includes measuring a distance between at least two tracks in order to determine said read azimuth angle.

7. A method of recording and reading information to and from a multi-track data storage tape to compensate for tape width variances in said multi-track data storage tape comprising steps of:

providing a magnetic head with an array of write/read pairs and servo read transducers, each write/read pair including a read transducer and a write transducer, said magnetic head having an adjustable angular orientation relative to a path of storage tape movement; and dynamically aligning each said read transducer such that each said read transducer is in a data-transfer relationship with a designated track of a plurality of tracks on said multi-track data storage tape by incrementally varying said angular orientation of said magnetic head in order to read said information, said magnetic head having a target read azimuth angle when aligned, said target read azimuth angle being greater than zero degrees relative to a widthwise direction of said multi-track data storage tape and responsive to a variation is said tape width that occurs after the writing of information of said tape.

8. The method of claim 7 further comprising a step of recording original information in said plurality of tracks on said multi-track data storage tape by positioning said magnetic head at a write azimuth angle.

9. The method of claim 8 wherein said step of recording said original information includes recording said original information by positioning said magnetic head at said write azimuth angle within an inclusive range of five degrees and thirty degrees.

10. The method of claim 8 wherein said step of recording said original information includes reading servo codes in said multi-track data storage tape by positioning said magnetic head at said write azimuth angle.

11. The method of claim 7 wherein said step of aligning each said read transducer to be in data-transfer relationship with said designated track includes determining when each said read transducer is positioned such that each said read transducer is immediately adjacent to said designated track by monitoring said servo codes being read during a read operation of said servo codes.

12. The method of claim 7 wherein said step of aligning each said read transducer to be in data-transfer relationship with said designated track includes determining a distance between two tracks of said plurality of tracks to calculate said target read azimuth angle.

13. The method of claim 7 further comprising a step of recording new information on said multi-track data storage tape by utilizing said magnetic head positioned at said read azimuth angle.

14. An apparatus for recording and reading information to and from a multi-track data storage tape that varies in width comprising:

magnetic head having an array of read transducers for writing and read information to said tape;

means attached to said magnetic head for pivoting said magnetic head in order to vary an azimuth angle of said magnetic head such that said azimuth angle is continuously greater than zero degrees relative to a widthwise direction of said multi-track data storage tape; and control circuitry operatively connected to said pivoting means to control said pivoting means to adjust said magnetic head into a position such that each read transducer is aligned into a data-exchange Position relative to a designated track on said multi-track data storage tape and is responsive to a variation in said tape width that occurs after writing of information on said tape.

15. The apparatus of claim 14 wherein at least one of said read transducers is configured to read servo codes from said multi-track data storage tape.

16. The apparatus of claim 15 wherein said control circuitry includes a servo processor configured to be responsive to said servo codes detected from said multi-track data storage tape to determine when each of said read transducers is aligned into a data-exchange position relative to said designated track on said multitrack data storage tape.

17. The apparatus of claim 15 wherein said array of read transducers is configured on said magnetic head such that outermost said read transducers are configured to read said servo codes from said multi-track data storage tape.

18. The apparatus of claim 17 wherein said array of read transducers contains ten read transducers.

19. The apparatus of claim 14 wherein said pivoting means includes a motor to pivot said magnetic head about one of said read transducers.

* * * * *